United States Patent [19]

Huber et al.

[11] Patent Number: 4,552,402

[45] Date of Patent: Nov. 12, 1985

[54] INSTALLATION FOR THE SUPPLY OF SEVERAL SIMILAR ELEMENTS WITH A MEDIUM UNDER ATMOSPHERIC EXCESS PRESSURE

[75] Inventors: Guntram Huber, Dachtel; Hermann Möller, Aidlingen; Eberhard Faust, Stuttgart; Rüdolf Andres, Sindelfingen; Wolfram Qüllmalz, Ehningen, all of Fed. Rep. of Germany

[73] Assignee: Daimler-Benz Aktiengesellschaft, Fed. Rep. of Germany

[21] Appl. No.: 435,957

[22] Filed: Oct. 22, 1982

[30] Foreign Application Priority Data

Oct. 29, 1981 [DE] Fed. Rep. of Germany ....... 3142833

[51] Int. Cl.⁴ ............................ A47C 3/00; B60N 1/00
[52] U.S. Cl. ......................................... 297/284; 5/455;
5/456; 297/458; 297/DIG. 3
[58] Field of Search .................. 5/455, 456, 453, 449,
5/450; 297/284, DIG. 3, 458

[56] References Cited

U.S. PATENT DOCUMENTS

| 2,136,510 | 11/1938 | Jensen | 297/DIG. 3 |
| 3,192,541 | 7/1965 | Moore | 297/284 X |
| 3,270,440 | 9/1966 | Radosevic, Jr. | 297/DIG. 3 |
| 3,363,941 | 1/1968 | Wierwille | 5/456 X |
| 3,867,732 | 2/1975 | Morrell | 297/DIG. 3 |
| 4,190,286 | 2/1980 | Bentley | 297/284 |

FOREIGN PATENT DOCUMENTS

| 2254471 | 7/1973 | Fed. Rep. of Germany | 297/284 |
| 2333941 | 1/1974 | Fed. Rep. of Germany | 297/284 |
| 754248 | 8/1956 | United Kingdom | 297/DIG. 3 |

Primary Examiner—James T. McCall
Attorney, Agent, or Firm—Craig and Burns

[57] ABSTRACT

An installation for the actuation of several controllable elements with modulated pressures, whereby the elements are constructed in particular as air chambers accommodated in the upholstery of a motor vehicle seat; the installation consists of only one pressure modulator and of a distribution device series-connected therewith; the pressure modulator is adapted to be selectively connected with one or several of the controllable elements by way of this distribution device.

16 Claims, 6 Drawing Figures

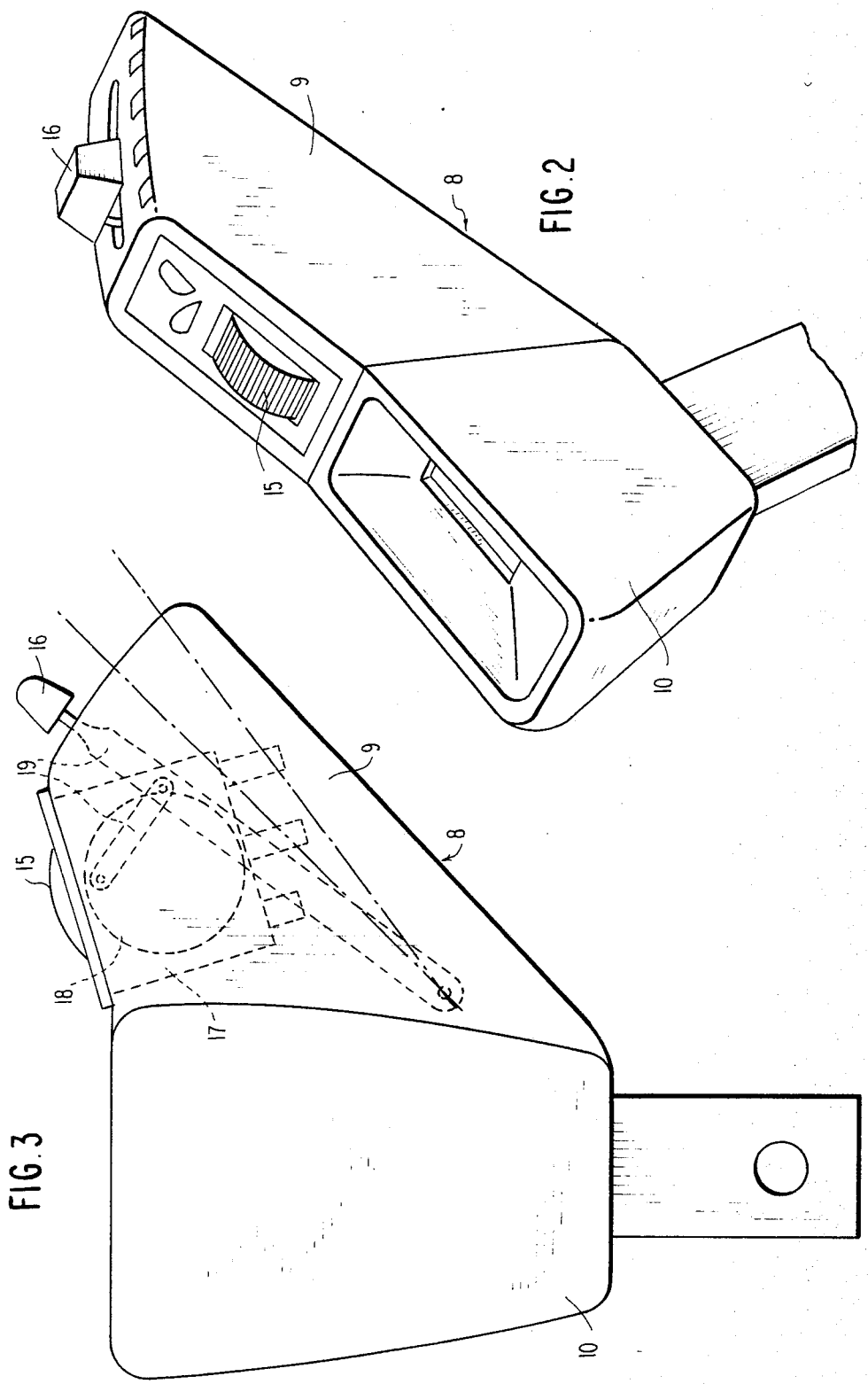

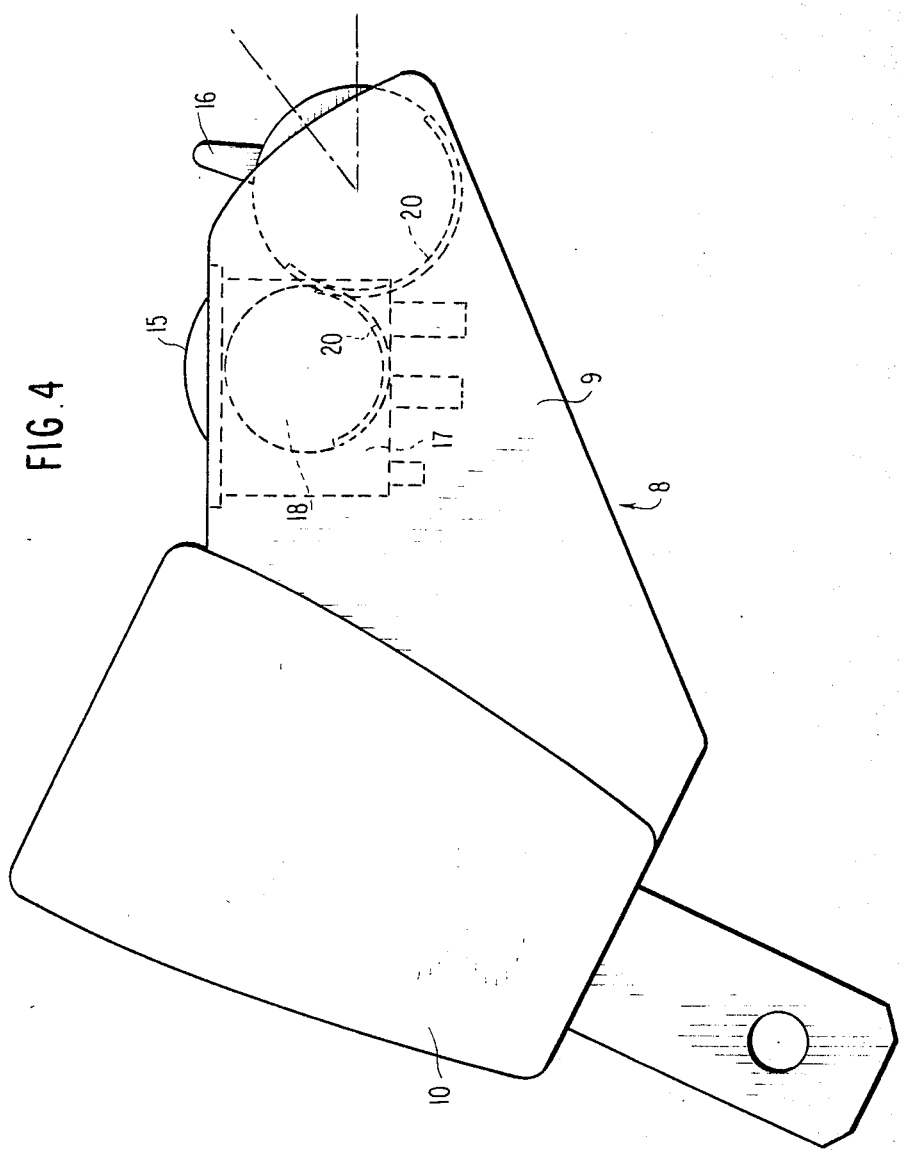

INSTALLATION FOR THE SUPPLY OF SEVERAL SIMILAR ELEMENTS WITH A MEDIUM UNDER ATMOSPHERIC EXCESS PRESSURE

The present invention relates to an installation for the supply of several similar elements with a medium under atmospheric excess pressure, whereby—accommodated within a common housing—a distribution device is series-connected with a valve while the outlets of the distribution device are connected with similar elements, especially for the supply of several air chambers arranged inside of the upholstery of a motor vehicle seat.

Such an installation, in which also the cross sections of the outlets leading to the connected loads are varied at the distribution device in dependence on the throttling effect of the valve, is known from the German Offenlegungsschrift No. 27 45 798. With loads having a different counterpressure, one obtains thereby a uniform supply flow to the loads at small opening cross sections of the valve.

If, in contrast thereto, air chambers arranged inside of the upholstery of a motor vehicle seat are to be acted upon for achieving different body support effects, then the installation described hereinabove which brings about a different supply flow at different valve positions, cannot be used since such an arrangement aims at maintaining a body support sensed as agreeable up to the intended change thereof.

An installation which fulfills this requirement is disclosed, for example, by the German Offenlegungsschrift No. 29 26 552, whereby one modulator each is coordinated to each air chamber. Though this arrangement enables an individual adaptation of the back support to the requirements of a respective user, the amassing of pressure modulators is disadvantageous in connection therewith, particularly if one considers that up to five air chambers are provided for achieving as great as possible a seating comfort.

It is the task of the present invention to so modify by simple means an installation of the aforementioned type that with an increase of the operating comfort and of the ease of monitoring, it can be utilized for changing the volume of air chambers which are arranged inside of the upholstery of a motor vehicle seat.

This is achieved if, according to the present invention, the valve is constructed as pressure modulator and if the pressure modulator is adapted to be selectively connected with one or several of the controllable elements by means of the distribution device.

In a preferred embodiment of the present invention, the distributor device is formed by plates arranged to be rotatable with respect to one another, whereby a fixed plate is provided with pressure medium outlets leading to the elements and a rotatable plate is provided with channels, slots or the like selectively connecting these pressure medium outlets—possibly in combination—with the pressure modulator.

If the installation is utilized for the control of different air chambers of a backrest of a motor vehicle seat, then a good operating ability results if the structural unit is coordinated to a bracket, such as the housing of a safety belt lock or a seat part and if it includes a knurled wheel for the actuation of the pressure modulator and an adjusting lever for the actuation of the distribution device.

According to a further feature of the present invention, the actuating plane for the modulator may be disposed predominantly horizontally and the actuating plane for the distribution device predominantly vertically.

Intentional control movements can be carried out also in darkness without impairing the traffic safety if the distribution device and/or an adjusting lever coordinated thereto is provided with detent positions, and if the height location thereof is in direct relationship with the height location of the controlled elements.

A structural unit involving low expenditures in transmission means, which also requires relatively little installation space, can be achieved if the distribution device is combined with the pressure modulator in a plane parallel to the knurled wheel and is connected with the adjusting lever by way of a transmission mechanism having a lever and/or toothed elements.

A favorable coupling of pressure modulator and distribution device with good space utilization is attainable if the distribution device is arranged below the pressure modulator and serves for clamping-in an operating diaphragm of the pressure modulator.

These and other objects, features and advantages of the present invention will become more apparent from the following description when taken in connection with the accompanying drawing which shows, for purposes of illustration only, two embodiments in accordance with the present invention, and wherein:

FIG. 2 is a perspective view, on an enlarged scale, showing the details of the parts indicated in FIG. 1 by the dash-and-dot circle X;

FIG. 3 is a side elevational view of the distribution device in accordance with the present invention provided with a lever arrangement for actuating the distribution device and adjoining the pressure modulator;

FIG. 4 is a side elevational view, similar to FIG. 3, of a distribution device with an actuating mechanism controlled by gear elements;

Figure 1:
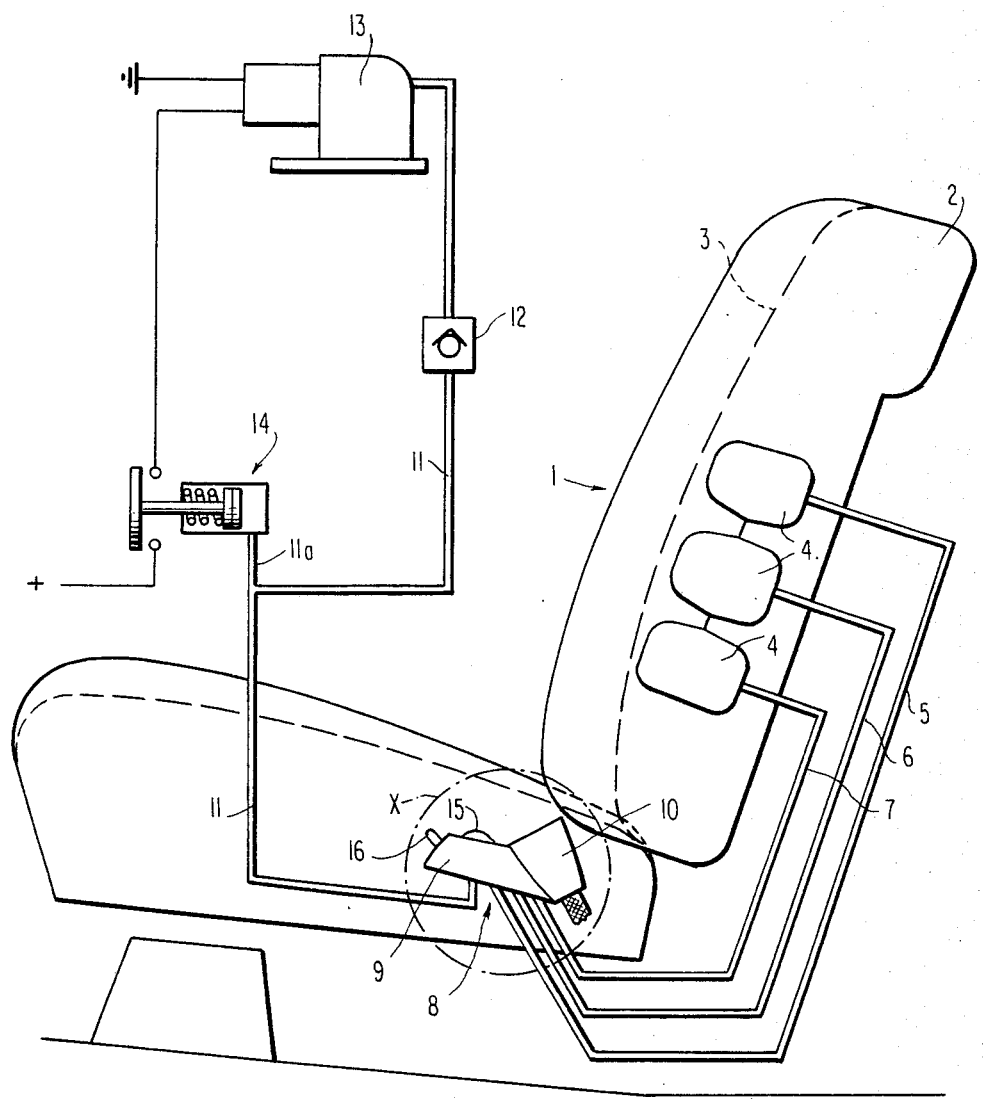
FIG. 1 is a somewhat schematic side elevational view of a seat with a back support whose chambers are connected with a pressure-actuated installation in accordance with the present invention.

Referring now to the drawing wherein like reference numerals are used throughout the various views to designate like parts, a motor vehicle seat generally designated by reference numeral 1, illustrated in FIG. 1, includes a backrest 2. Elements 4 in the form of air chambers are embedded in the upholstery 3 of the backrest 2, which are adapted to be pumped up more or less strongly for achieving a desired back support. In the illustrated embodiment, three elements 4 are arranged one above the other which are operatively connected by way of lines 5, 6, and 7 with a control installation generally designated by reference numeral 8. The installation 8, not illustrated in detail in FIG. 1, is accommodated by a support bracket 9 which adjoins the housing 10 of a safety belt lock and is operatively connected by way of a branching line 11, in which is arranged a check valve 12, with an electrically actuated pressure source 13. The pressure source 13 of any conventional construction is actuated by a pressure monitor generally designated by reference numeral 14 installed into a line branch 11a.

As is shown in particular by FIG. 2, a knurled wheel 15 disposed predominantly horizontally with respect to its actuating plane projects out of the bracket 9 and an adjusting lever 16 disposed predominantly vertically with respect to its actuating plane also projects out of the bracket 9; the adjusting lever 16 is provided with five marked detent positions, which may be coordinated to three elements, whereby in the lowermost detent position only the lower element is acted upon and in the next detent position, the lower and center elements are acted upon. In the third detent position, for example, only the center element will be controlled, in the fourth position, the center and upper elements, and finally in the uppermost step, only the upper chamber. In this manner, a universal control possibility exists.

It can be seen from FIGS. 3 and 4 that the knurled wheel 15 is coordinated to a pressure modulator 17 indicated in dash lines and the adjusting lever 16 to a distribution device 18 also only indicated schematically in dash lines, whereby according to FIG. 3, the sliding movements of the adjusting lever 16 are transmitted to the distribution device 18 by a transmission mechanism formed by levers 19 whereas according to FIG. 4, toothed elements 20 are used for movement transmission.

Figure 6:
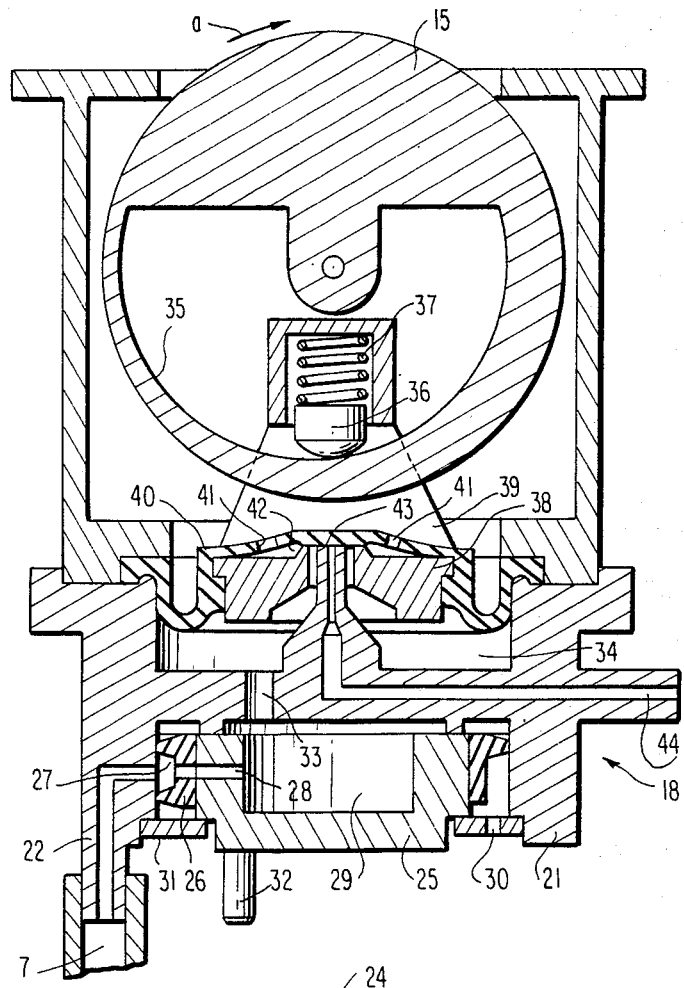
FIG. 6 is a cross-sectional view taken along line VI—VI of FIG. 5.
Figure 5:
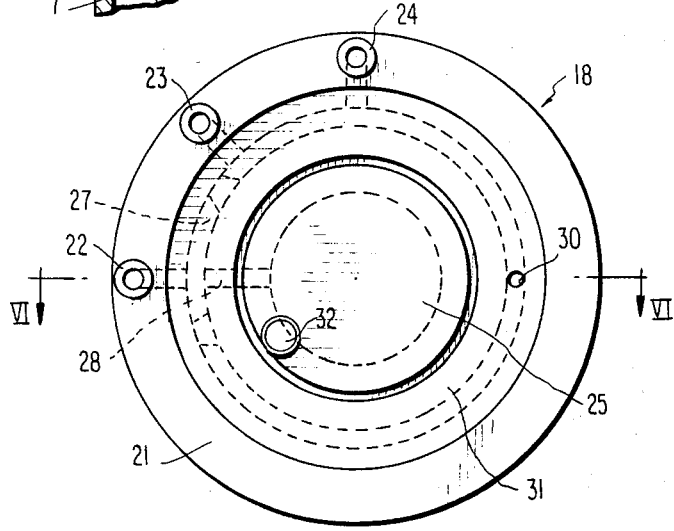
FIG. 5 is a bottom view of a distribution device of the present invention arranged below a pressure modulator.

FIG. 5 illustrates a simplified bottom view of a distribution device generally designated by reference numeral 18 which, according to FIG. 6, is arranged below a pressure modulator 17. The distribution device 18 essentially consists of a fixed plate 21 with pressure medium outlets 22, 23, and 24 and of a rotatably supported plate 25 which includes, along its circumference, a sealing ring 26 with a channel 27. The channel 27 is in communication by way of a bore 28 with a pressure space 29 so that, depending on the rotational position of the plate 25, the series-connected elements on the side of the seat can be acted upon in the manner described in conjunction with FIG. 2 by way of the pressure medium outlets 22, 23 and 24 and the coordinated lines, of which only the line 7 is indicated, whereby the elements not connected with the pressure source are connected with the atmosphere by way of an opening 30 in a ring 31 axially securing the plate 25 owing to the fact that the sealing ring 26 does not abut within this area. However, it would also be feasible to seal off the elements not connected with the pressure source by means of the sealing ring 26, as a result of which a still greater possibility of variation would exist. The pivot movements of the adjusting lever 16 are thereby transmitted to the plate 25 by way of a pin 32 projecting from the plate 25.

The pressure space 29 is in communication by way of a bore 33 with a space 34 of the pressure modulator 17. The knurled wheel 15 thereof acts on a sickle-shaped control surface 35, against which abuts a spring-loaded sensor 36. The coordinated spring 37 is supported at a bracket-like element 39 provided with a sealing plate 38, whereby the sealing pate 38 is received by a working diaphragm 40 which is clamped-in along its ends by means of the distribution device 18. The diaphragm 40 is provided with openings 41 so that a space 42 enclosed by the working diaphragm 40 and the sealing plate 38 is connected with the outside atmosphere.

If one rotates the knurled wheel 15 in the direction of the arrow "a" in FIG. 6, then the sealing plate 38 is lifted together with the operating diaphragm 40 and thus distances itself from a sealing surface 43 which is disposed on the outlet side of a channel 44 which is machined into the distribution device 18. Since, contrary to the embodiment according to FIG. 1, vacuum serves as pressure source in this embodiment and the elements are provided with an air-permeable foam or other spring elements in a manner not illustrated herein, the pressure in the space 29 and thus also in the interconnected element is decreased to such an extent until the sealing edge of the sealing plate 38 returning against the pressure of the spring 37 is again disposed in a plane with the free end of the channel 44 and a sealing-off takes place by the working diaphragm 40. As a result of the pressure decrease in the coordinated element, respectively, in the coordinated elements, the volume thereof is reduced and the back support is lessened.

If, in contrast thereto, one rotates the knurled wheel 15 in a direction opposite the arrow "a", then only the sealing plate 38 moves downwardly, whereas the channel 44 continues to be closed off by the operating diaphragm 40. Atmospheric air flows by way of the openings 41 in the operating diaphragm 40 to the connected element by way of the pressure space 29, whereby the connected element expands for such length of time until the sealing plate 38 returning to its starting position again abuts with its sealing edge sealingly at the operating diaphragm 40.

As already indicated in FIG. 1, the installation may also be operated by means of excess pressure if a functional reversal of the modulator is undertaken by simple known structural measures. With such a connection, the elements connected with the atmosphere have a smaller space volume which by a corresponding control can then assume a dimension perceived as agreeable by the respective user.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An installation for the supply of several similar elements with a pressure medium under atmospheric excess pressure for the control of different air chambers of a backrest of a motor vehicle seat, comprising a valve means and a distribution means series-connected with said valve means, said distribution means having outlets adapted to be connected with the similar elements, characterized in that the valve means is constructed as pressure modulator means and in that the pressure modulator means is operable to be selectively connected with at least one of said elements by said distribution means, and wherein the installation includes a structural unit coordinated to a bracket means for the actuation of the pressure modulator means.

2. An installation for the supply of several similar elements with a pressure medium under atmospheric excess pressure for the control of different air chambers of a backrest of a motor vehicle seat, comprising a valve means and a distribution means series-connected with said valve means, said distribution means having outlets adapted to be connected with the similar elements, characterized in that the valve means is constructed as pressure modulator means and in that the pressure modulator means is operable to be selectively connected with at least one of said elements by said distribution means, and wherein the installation includes a structural unit coordinated to a bracket means, said structural unit including a knurled wheel for the actuation of the pressure modulator means and an adjusting lever for the actuation of the distribution means.

3. An installation according to claim 2, characterized in that the bracket means is formed at least in part by a housing of a safety belt lock.

4. An installation according to claim 2, characterized in that said bracket means is formed by a seat part.

5. An installation for the supply of several similar elements with a pressure medium under atmospheric excess pressure, comprising a valve means and a distribution means series-connected with said valve means, said distribution means having outlets adapted to be connected with the similar elements, characterized in that the valve means is constructed as pressure modulator means and in that the pressure modulator means is operable to be selectively connected with at least one of said elements by said distribution means, wherein the actuating plane for the modulator means is predominantly horizontal and the actuating plane for the distribution means predominantly vertical.

6. An installation according to claim 5, characterized in that the distribution means includes detent positions whose height location is in direct relationship with the height location of the controlled elements.

7. An installation according to claim 5, characterized in that an adjusting lever coordinated to the distribution means includes several detent positions whose height location is in direct relationship to the height location of the controlled elements.

8. An installation for the supply of several similar elements with a pressure medium under atmospheric excess pressure, comprising a valve means and a distribution means series-connected with said valve means, said distribution means having outlets adapted to be connected with the similar elements, characterized in that the valve means is constructed as pressure modulator means and in that the pressure modulator means is operable to be selectively connected with at least one of said elements by said distribution means, wherein the distribution means, is combined with the pressure modulator means in a plane substantially parallel to a knurled wheel and is operatively connected with an adjusting lever by way of a transmission means.

9. An installation according to claim 8, characterized in that the transmission means includes at least one of lever and gear means.

10. An installation for the supply of several similar elements with a pressure medium under atmospheric excess pressure, comprising a valve means and a distribution means series-connected with said valve means, said distribution means having outlets adapted to be connected with the similar elements, characterized in that the valve means is constructed as pressure modulator means and in that the pressure modulator means is operable to be selectively connected with at least one of said elements by said distribution means, wherein the distribution means is arranged below the pressure modulator means and serves for clamping in a working diaphragm of the pressure modulator means.

11. An installation according to claim 2, characterized in that the distribution means is combined with the pressure modulator means in a plane substantially parallel to the knurled wheel and is operatively connected with the adjusting lever by way of a transmission means.

12. An installation according to claim 15, characterized in that the actuating plane for the modulator means is predominantly horizontal and the actuating plane for the distribution means predominantly vertical.

13. An installation according to claim 12, characterized in that the adjusting lever coordinated to the distribution means includes several detent positions whose height location is in direct relationship to the height location of the controlled elements.

14. An installation according to claim 2, characterized in that the distribution means includes two mutually rotatable plate means, one of said plate means being relatively stationary and provided with pressure medium outlets leading to the elements and the other plate means being a rotatable plate means provided with aperture means operable to selectively connect said pressure medium outlets with the pressure modulator means.

15. An installation according to claim 14, characterized in that the distribution means is arranged below the pressure modulator means and serves for clamping in a working diaphragm of the pressure modulator means.

16. An installation according to claim 15, characterized in that the distribution means is combined with the pressure modulator means in a plane substantially parallel to the knurled wheel and is operatively connected with the adjusting lever by way of a transmission means.

* * * * *